(12) United States Patent
Sato et al.

(10) Patent No.: US 12,440,794 B2
(45) Date of Patent: Oct. 14, 2025

(54) AIR FILTER MEDIUM, FILTER PLEAT PACK, AND AIR FILTER UNIT

(71) Applicant: NITTO DENKO CORPORATION, Osaka (JP)

(72) Inventors: Go Sato, Osaka (JP); Masaaki Mori, Osaka (JP); Shunsuke Masaki, Osaka (JP); Yusuke Ikemura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 302 days.

(21) Appl. No.: 18/027,455

(22) PCT Filed: Sep. 28, 2021

(86) PCT No.: PCT/JP2021/035723
§ 371 (c)(1),
(2) Date: Mar. 21, 2023

(87) PCT Pub. No.: WO2022/065516
PCT Pub. Date: Mar. 31, 2022

(65) Prior Publication Data
US 2023/0364547 A1 Nov. 16, 2023

(30) Foreign Application Priority Data
Sep. 28, 2020 (JP) .................. 2020-162641

(51) Int. Cl.
*B01D 46/54* (2006.01)
*B01D 39/16* (2006.01)
(Continued)

(52) U.S. Cl.
CPC ....... *B01D 46/543* (2013.01); *B01D 39/1692* (2013.01); *B01D 39/2003* (2013.01);
(Continued)

(58) Field of Classification Search
CPC .............. B01D 46/543; B01D 39/2003; B01D 39/2017; B01D 39/2024; B01D 46/521;
(Continued)

(56) References Cited

U.S. PATENT DOCUMENTS

| | | | |
|---|---|---|---|
| 2003/0010210 A1* | 1/2003 | Kawano | B01D 39/163 55/486 |
| 2010/0236202 A1 | 9/2010 | Gutsche et al. | |

(Continued)

FOREIGN PATENT DOCUMENTS

| | | |
|---|---|---|
| JP | 2004-188355 | 7/2004 |
| JP | 2007-75739 | 3/2007 |

(Continued)

OTHER PUBLICATIONS

International Search Report issued in International Patent Application No. PCT/JP2021/035723, dated Nov. 30, 2021.
(Continued)

*Primary Examiner* — Robert Clemente
(74) *Attorney, Agent, or Firm* — GREENBLUM & BERNSTEIN, P.L.C.

(57) ABSTRACT

A provided air filter medium is an air filter medium including a porous fluorine resin membrane, the air filter medium further including: a glass filter medium layer. The glass filter medium layer and the porous fluorine resin membrane are placed in this order from upstream to downstream of the air filter medium configured to allow an air flow to pass through the air filter medium. At a surface of the glass filter medium layer on an upstream side in a direction of the air flow, a carbon-to-silicon ratio (C/Si) evaluated by X-ray fluorescent analysis is 0.020 or more. This air filter medium is suitable for reducing a pressure drop increase even in an environment including liquid particles such as oil mist.

12 Claims, 4 Drawing Sheets

(51) Int. Cl.
  *B01D 39/20* (2006.01)
  *B01D 46/52* (2006.01)
  *B01D 71/36* (2006.01)
(52) U.S. Cl.
  CPC ........... *B01D 46/521* (2013.01); *B01D 71/36* (2013.01); *B01D 2239/0654* (2013.01); *B01D 2275/105* (2013.01)
(58) Field of Classification Search
  CPC ................ B01D 71/36; B01D 39/1692; B01D 2239/0654; B01D 2275/105
  See application file for complete search history.

(56) References Cited

U.S. PATENT DOCUMENTS

| | | | |
|---|---|---|---|
| 2012/0031832 A1* | 2/2012 | Yamaguchi | B01D 29/111 210/450 |
| 2014/0165517 A1 | 6/2014 | Hara et al. | |
| 2018/0193784 A1* | 7/2018 | Englund | B01D 46/523 |
| 2019/0030473 A1* | 1/2019 | Gao | B01D 39/2024 |
| 2019/0344204 A1 | 11/2019 | Sakano et al. | |
| 2021/0260516 A1* | 8/2021 | Inui | B01D 39/2017 |

FOREIGN PATENT DOCUMENTS

| | | |
|---|---|---|
| JP | 2011-502756 | 1/2011 |
| JP | 2013-63424 | 4/2013 |
| JP | 2017-159281 | 9/2017 |

OTHER PUBLICATIONS

Written Opinion issued in International Patent Application No. PCT/JP2021/035723, dated Nov. 30, 2021.
Japan, Notice of Reasons for Refusal received in Japanese Patent Application No. 2022-552118, Jun. 24, 2025.

* cited by examiner

AIR FILTER MEDIUM, FILTER PLEAT PACK, AND AIR FILTER UNIT

TECHNICAL FIELD

The present invention relates to an air filter medium including a porous fluorine resin membrane, a filter pleat pack including the filter medium, and an air filter unit including the filter medium.

BACKGROUND ART

Because having a large number of fine pores and a high collection capability to collect particles such as dusts, porous fluorine resin membranes are included in various types of air filter mediums. Porous fluorine resin membranes generally function as surface filtration media that collect collection objects, i.e. objects to be collected, at their surface portions. Therefore, when used for collecting particles in air, for example, as a filter for outside air treatment or an air-intake filter for turbines, an air filter medium including a porous fluorine resin membrane is likely to experience a pressure drop increase due to clogging. In consideration of this, a prefilter is conventionally placed on the upstream side in a direction of an air flow that passes through a porous fluorine resin membrane. By having the prefilter collect some amount of a collection object having a relatively large particle size, clogging of the porous fluorine resin membrane located on the downstream side in the air flow direction can be reduced and the service life of the air filter medium can be increased. Patent Literature 1 discloses an exemplary air filter medium including a porous polytetrafluoroethylene (hereinafter referred to as "PTFE") membrane, which is a type of porous fluorine resin membrane, and a prefilter.

CITATION LIST

Patent Literature

Patent Literature 1: JP 2013-063424 A

SUMMARY OF INVENTION

Technical Problem

Air contains not only solid particles such as dust and salt particles but also, in some cases, nonvolatile liquid particles (hereinafter simply referred to as "liquid particles") such as oil mist. Studies by the present inventors have revealed that in an environment including liquid particles, even air filter mediums including prefilters experience a pressure drop increase in a short period of time. Patent Literature 1 takes no account of this point.

The present invention aims to provide an air filter medium including a porous fluorine resin membrane and being suitable for reducing a pressure drop increase even in an environment including liquid particles such as oil mist.

Solution to Problem

The present invention provides an air filter medium including a porous fluorine resin membrane, the air filter medium further including:

a glass filter medium layer, wherein
the glass filter medium layer and the porous fluorine resin membrane are placed in this order from upstream to downstream of the air filter medium configured to allow an air flow to pass through the air filter medium, and at a surface of the glass filter medium layer on an upstream side in a direction of the air flow, a carbon-to-silicon ratio (C/Si) evaluated by X-ray fluorescent analysis is 0.020 or more.

In another aspect, the present invention provides a filter pleat pack including an air filter medium folded into pleats, wherein the air filter medium is the above air filter medium of the present invention.

In still another aspect, the present invention provides an air filter unit including an air filter medium, wherein the air filter medium is the above air filter medium of the present invention.

In still another aspect, the present invention provides an air filter unit including a filter pleat pack, wherein the filter pleat pack is the above filter pleat pack of the present invention.

Advantageous Effects of Invention

According to the present invention, an air filter medium including a porous fluorine resin membrane and being suitable for reducing a pressure drop increase even in an environment including liquid particles such as oil mist can be achieved.

DESCRIPTION OF EMBODIMENTS

Hereinafter, embodiments of the present invention will be described with reference to the drawings. The present invention is not limited to the following embodiments.

[Air Filter Medium]

Figure 1:
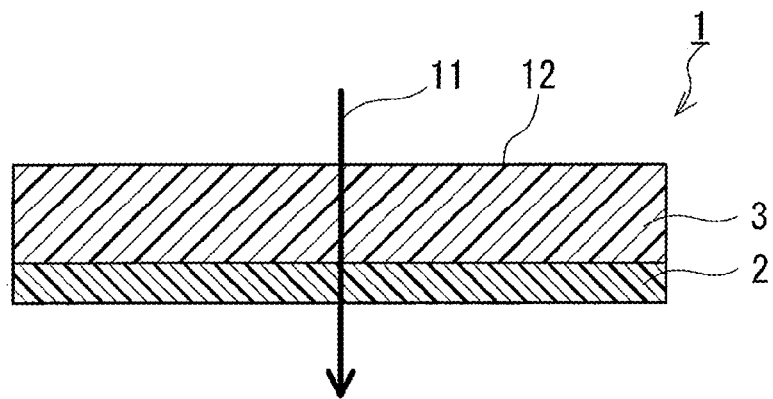
FIG. 1 is a cross-sectional view schematically showing an example of the air filter medium of the present invention.

FIG. 1 shows an example of the air filter medium of the present embodiment. An air filter medium 1 of FIG. 1 is a filter medium including a porous fluorine resin membrane 2. The air filter medium 1 further includes a glass filter medium layer 3. The glass filter medium layer 3 and the porous fluorine resin membrane 2 are placed in this order from upstream to downstream of the air filter medium 1 configured to allow an air flow 11 to pass through the air filter medium 1. In other words, the glass filter medium layer 3 is placed on an upstream side in a direction of the air flow 11 with respect to the porous fluorine resin membrane 2. The air filter medium 1 of FIG. 1 includes one glass filter medium layer 3 and one porous fluorine resin membrane 2.

At a surface 12 of the glass filter medium layer 3 on the upstream side in the direction of the air flow 11, a ratio C/Si evaluated by X-ray fluorescent analysis (hereinafter referred to as XRF) is 0.020 or more. Since C/Si at the surface 12 is 0.020 or more, the affinity of the surface 12 for liquid particles (typically an organic substance) such as oil mist increases. This is thought to make it likely that liquid particles collected by the glass filter medium layer 3 stays near the surface of the glass filter medium layer 3. The ratio C/Si may be 0.022 or more, 0.023 or more, 0.025 or more, or even 0.027 or more. The upper limit of C/Si is, for example, 0.050 or less, and may be 0.040 or less, 0.038 or less, 0.035 or less, 0.033 or less, or even 0.030 or less. The ratio C/Si can be evaluated using an X-ray fluorescence analyzer (for example, scanning X-ray fluorescence analyzers ZSX Primus series manufactured by Rigaku Corporation).

Silicon (Si) at the surface 12 is chiefly derived from a glass included in the glass filter medium layer 3. Carbon (C) at the surface 12 is, for example, derived from a binder the glass filter medium layer 3 can include. The glass filter medium layer 3 formed of a fibrous material including glass fibers generally includes a binder for binding the fibers.

(Glass Filter Medium Layer)

The glass filter medium layer 3 can function as a prefilter for collecting a portion of a collection object included in the air flow 11. The collection object includes liquid particles such as oil mist. The glass filter medium layer 3 generally functions as a depth filtration medium that collects the collection object inside the layer.

The glass filter medium layer 3 is typically formed of the fibrous material including the glass fibers. The glass filter medium layer 3 may be formed of the glass fibers.

An average fiber diameter of the glass fibers may be 0.5 to 2.0 μm. For the same grammage, the smaller the average fiber diameter is, the higher the collection capability of the glass filter medium layer 3 is. Herein, the average fiber diameter of a fibrous material is defined as an average of diameters of at least 20 fibers randomly selected in an enlarged image of a surface and/or cross-section of a layer formed of the fibrous material. The enlarged image is, for example, a microscope image obtained by a scanning electron microscope (SEM), a laser microscope, or the like. The enlarged image is, for example, at a magnification of about 100 to 500 times. The diameter of each selected fiber can be determined, for example, by image analysis as a fiber width in a direction perpendicular to a direction in which the fiber extends.

The average fiber diameter may be substantially uniform in a thickness direction of the glass filter medium layer 3. Herein, the average fiber diameter is considered substantially uniform even when a difference is 20% or less, preferably 10% or less. The difference is expressed by an expression $(D_{max}-D_{min})/D_{min}$, where, of a plurality of average fiber diameters D compared with each other, the smallest average fiber diameter is $D_{min}$ and the largest average fiber diameter is $D_{max}$.

The glass filter medium layer 3 may include a material other than the above-described one. An example of the material is a binder for binding the fibers in the glass filter medium layer 3 formed of the fibrous material. The binder is typically formed of a resin. Examples of the resin include an acrylic resin, a polyvinyl alcohol resin, and a polyethylene oxide resin.

A thickness of the glass filter medium layer 3 is, for example, 100 to 500 μm, and may be 200 to 450 μm, or even 250 to 400 μm.

A grammage (weight per unit area) of the glass filter medium layer 3 is, for example, 20 to 100 g/m², and may be 30 to 90 g/m², or even 40 to 80 g/m².

An initial pressure drop $PD_0$ of the glass filter medium layer 3 at a permeate flow rate of 5.3 cm/sec is, for example, 15 to 175 Pa, and may be 30 to 110 Pa.

A pressure drop PD of each of the air filter medium 1 and the layers included in the air filter medium 1 can be evaluated in the following manner. The filter medium or layer serving as an evaluation object is set in a circular holder with an effective area of 100 cm². The pressure drop is measured with a pressure meter (manometer) under conditions where air is allowed to pass through the set evaluation object and the linear velocity of the air passing through the evaluation object is adjusted to 5.3 cm/sec with the aid of a flow meter. It should be noted that for evaluation of the pressure drop PD of the air filter medium 1, the air is allowed to flow in a direction from the glass filter medium layer 3 toward the porous fluorine resin membrane 2. The pressure drop is measured eight times for one evaluation object, and the average of the eight values is defined as the pressure drop PD.

A collection efficiency CE of the glass filter medium layer 3 is, for example, 60 to 95%, and may be 40 to 99%, the collection efficiency CE being measured using polyalphaolefin (PAO) particles (hereinafter referred to as "polydisperse PAO particles") being polydisperse particles having a peak in number in a particle size range of 0.1 to 0.2 μm under conditions where an evaluation target particle size is 0.3 to 0.5 μm and the permeate flow rate is 5.3 cm/sec. The glass filter medium layer 3 can generally have a higher collection capability than a prefilter formed of a non-woven fabric formed of a resin fiber.

The collection efficiency CE of each of the air filter medium 1 and the layers included in the air filter medium 1 can be evaluated in the following manner. The filter medium or layer serving as an evaluation object is set in a circular holder with an effective area of 100 cm². Air is allowed to pass through the set evaluation object, and the linear velocity of the air passing through the filter medium 1 is adjusted to 5.3 cm/sec with the aid of a flow meter. It should be noted that for evaluation of the collection efficiency CE of the air filter medium 1, the air is allowed to flow in the direction from the filter medium layer 3 toward the porous fluorine resin membrane 2. Then, polydisperse PAO particles are introduced in the air passing through the evaluation object such that the concentration of particles having a particle size of 0.1 to 0.2 μm is $4\times10^8$ particles/L or more. The polydisperse PAO particles can be generated, for example, using a constant-output aerosol atomizer. After that, the concentration of polydisperse PAO particles included in the air having passed through the evaluation object is measured using a particle counter placed downstream of the holder, the polydisperse PAO particles having a particle size in the above evaluation target range. The collection efficiency CE of the evaluation object is calculated by the following equation (1). Both upstream and downstream particle concentrations in the equation (1) refer to the concentrations of particles having a particle size in the evaluation target range. The upstream particle concentration can be determined by allowing the above air in which the polydisperse PAO particles are introduced to flow without setting the evaluation object in the holder and analyzing the air using the above particle counter.

Collection efficiency CE=[1−(downstream particle concentration)/(upstream particle concentration)]×100(%)  (1)

The PF (performance factor) value determined for the glass filter medium layer 3 by the following equation (2) is, for example, 3 to 15, and may be 5 to 12, or even 10 to 12. The PF value of the glass filter medium layer 3 formed of the fibrous material including the glass fibers can be 10 or more. In the equation (2), PD represents the initial pressure drop, and CE represents the collection efficiency. It should be noted that the unit of the pressure drop PD in the equation (2) is mmH$_2$O.

PF value={−log[(100−CE)/100]/PD}×100  (2)

The glass filter medium layer 3 of FIG. 1 may be a single layer. The glass filter medium layer 3 may be a laminate composed of two or more identical or different layers.

In the air filter medium 1 of FIG. 1, the upstream surface 12 of the glass filter medium layer 3 forms one of exposed surfaces of the filter medium 1. The exposed surface is a surface through which the air flow 11 flows into the filter medium 1. An additional layer may be placed on the upstream side in the direction of the air flow 11 with respect to the glass filter medium layer 3.

In the air filter medium 1 of FIG. 1, the glass filter medium layer 3 and the porous fluorine resin membrane 2 are in contact with each other. An additional layer may be placed between the glass filter medium layer 3 and the porous fluorine resin membrane 2. The glass filter medium layer 3 reduces occurrence of static electricity during manufacture and use of the air filter medium 1, compared to a prefilter formed of a non-woven fabric formed of a resin fiber. As a result, damage by static electricity to the porous fluorine resin membrane 2 in contact with the glass filter medium layer 3 can be reduced.

(Porous Fluorine Resin Membrane)

The porous fluorine resin membrane 2 can function as a main filter of the air filter medium 1. The porous fluorine resin membrane 2 generally functions as a surface filtration medium that collects a collection object at its surface portion.

The porous fluorine resin membrane 2 is typically formed of countless fluorine resin fibrils, which are fine fibrous structures. The porous fluorine resin membrane may include a fluorine resin node connected to the fibril.

The porous fluorine resin membrane 2 is formed chiefly of a fluorine resin. Saying that the porous fluorine resin membrane 2 is formed chiefly of a fluorine resin means that the fluorine resin content is greatest of the contents of all components included in the porous fluorine resin membrane 2. The fluorine resin content in the porous fluorine resin membrane 2 is, for example, 50 weight % or more, and may be 60 weight % or more, 70 weight % or more, 80 weight % or more, 90 weight % or more, or even 95 weight % or more. The porous fluorine resin membrane 2 can include a filler in addition to the fluorine resin.

Examples of the fluorine resin include PTFE, an ethylene-tetrafluoroethylene-hexafluoropropylene copolymer (EFEP), a tetrafluoroethylene-hexafluoropropylene-vinylidene fluoride copolymer (THV), a tetrafluoroethylene-hexafluoropropylene copolymer (FEP), a tetrafluoroethylene-perfluoroalkoxyethylene copolymer (PFA), and an ethylene-tetrafluoroethylene copolymer (ETFE).

The porous fluorine resin membrane 2 may include two or more fluorine resins.

The porous fluorine resin membrane 2 may be a porous PTFE membrane.

The porous fluorine resin membrane 2 can be formed, for example, by molding a mixture of an unsintered fluorine resin powder and a liquid lubricant into a film by a method such as extrusion and/or rolling, removing the liquid lubricant from the obtained unsintered film, and then stretching the unsintered film. At any timing after the formation of the unsintered film, sintering may be performed in which the film is heated to a temperature equal to or higher than the melting point of the fluorine resin. Examples of the liquid lubricant include hydrocarbon oils such as naphtha, white oil, and liquid paraffin. However, the liquid lubricant is not limited as long as the liquid lubricant can wet the surfaces of the fluorine resin particles and be removed later. An example of the stretching is biaxial stretching that is a combination of stretching at a stretching ratio of 2 to 60 in an MD (longitudinal direction) of the unsintered film and a stretching temperature of 150 to 390° C. and stretching at a stretching ratio of 10 to 60 in a TD (width direction) of the film and a stretching temperature of 40 to 150° C. However, the method for producing the porous fluorine resin membrane 2 is not limited as long as a collection capability suitable for the intended use of the air filter medium 1 is obtained.

The thickness of the porous fluorine resin membrane 2 is, for example, 1 to 100 μm, and may be 2 to 50 μm, or even 3 to 20 μm.

The porous fluorine resin membrane 2 has a porosity of, for example, 70 to 98%. The porosity can be measured in the following manner. The porous fluorine resin membrane 2 serving as an evaluation object is cut to given dimensions (for example, a 6-cm-diameter circle), and the volume and mass thereof are determined. The porosity can be calculated by substituting the volume and mass into the following equation (3). In the equation (3), V (unit: cm$^3$) represents the volume, W (unit: g) represents the mass, and D (unit: g/cm$^3$) represents the true density of the fluorine resin.

Porosity (%)=100×[V−(W/D)]/V  (3)

The grammage of the porous fluorine resin membrane 2 is, for example, 0.05 to 10 g/m$^2$, and may be 0.1 to 5 g/m$^2$, or even 0.3 to 3 g/m$^2$.

The average fiber diameter (the average fiber diameter of the fibrils) of the porous fluorine resin membrane 2 is, for example, 0.2 μm or less, and the average fiber diameter may be 0.15 μm or less, or even 0.1 μm or less. The lower limit of the average fiber diameter is, for example, 0.05 μm or more, and may be 0.08 μm or more. The porous fluorine resin membrane 2 having a smaller average fiber diameter generally has a higher collection capability. The collection capability can be represented by the PF value, and a higher PF value means a higher collection capability.

The initial pressure drop PD$_0$ of the porous fluorine resin membrane 2 at a permeate flow rate of 5.3 cm/sec is, for example, 10 to 200 Pa, and may be 20 to 150 Pa, or even 30 to 100 Pa.

The collection efficiency CE measured for the porous fluorine resin membrane 2 using polydisperse PAO particles under conditions where the evaluation target particle size is 0.1 to 0.2 μm and the permeate flow rate is 5.3 cm/sec is, for example, 50 to 99.9%, and may be 60 to 99%, or even 70 to 98%.

The PF value determined for the porous fluorine resin membrane 2 by the above equation (2) is, for example, 20 or more, and may be 22 or more, 23 or more, 25 or more, 27 or more, 28 or more, or even 30 or more. The upper limit of the PF value is, for example, 40 or less, and may be 38 or less, 36 or less, or even 35 or less. The porous fluorine resin membrane 2 having an average fiber diameter of 0.05 μm or more and 0.1 μm or less can have a PF value of 25 to 40. The porous fluorine resin membrane 2 having an average fiber diameter of more than 0.1 μm and 0.2 μm or less can have a PF value of 20 to 25.

The porous fluorine resin membrane 2 of FIG. 1 is a single layer. The porous fluorine resin membrane 2 may be a laminate composed of two or more identical or different layers.

The air filter medium 1 of FIG. 1 includes one porous fluorine resin membrane 2. However, the air filter medium 1 may include an additional porous fluorine resin membrane other than the porous fluorine resin membrane 2.

In the air filter medium 1 of FIG. 1, one outermost layer is the glass filter medium layer 3, and the other outermost layer is the porous fluorine resin membrane 2.

The air filter medium of the present invention may include an additional layer and/or member as long as the effects of the present invention can be achieved.

Figure 2:
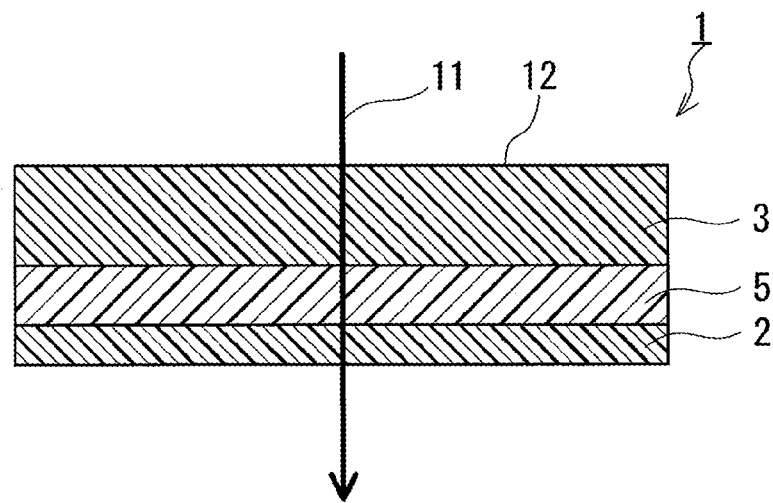
FIG. 2 is a cross-sectional view schematically showing another example of the air filter medium of the present invention.

FIG. 2 shows an example of the air filter medium 1 including the additional layer. The air filter medium 1 of FIG. 2 further includes a first air-permeable supporting layer 5. The air-permeable supporting layer 5 is placed between the glass filter medium layer 3 and the porous fluorine resin membrane 2. In the air filter medium 1 of FIG. 2, the glass filter medium layer 3, the air-permeable supporting layer 5, and the porous fluorine resin membrane 2 are placed in this order from upstream to downstream of the air filter medium 1 configured to allow the air flow 11 to pass through the air filter medium 1. In other words, the glass filter medium layer 3 and the air-permeable supporting layer 5 are placed in this order from upstream on the upstream side in the direction of the air flow 11 with respect to the porous fluorine resin membrane 2. The air filter medium 1 of FIG. 2 includes one glass filter medium layer 3, one air-permeable supporting layer 5, and one porous fluorine resin membrane 2.

(First Air-Permeable Supporting Layer)

The first air-permeable supporting layer 5 can function as a layer supporting the porous fluorine resin membrane 2 from the upstream side in the direction of the air flow 11. The first air-permeable supporting layer 5 can function as a layer that hinders movement of liquid particles once collected by the glass filter medium layer 3 to the porous fluorine resin membrane 2.

The air-permeable supporting layer 5 is, for example, formed of a fibrous material. The average fiber diameter of the fibrous material that can form the air-permeable supporting layer 5 may be greater than the average fiber diameter of the fibrous material that can form the glass filter medium layer 3. In other words, the function of the air-permeable supporting layer 5 as a prefilter for collecting a portion of the collection object included in the air flow 11 may be lower than that of the glass filter medium layer 3.

The average fiber diameter of the fibrous material that can form the air-permeable supporting layer 5 may be more than 5 μm, 8 μm or more, 12 μm or more, 16 μm or more, or even 18 μm or more. The upper limit of the average fiber diameter is, for example, 50 μm or less, and may be 40 μm or less, 30 μm or less, or even 27 μm or less.

The fibrous material that can form the air-permeable supporting layer 5 includes, for example, at least one fiber selected from a glass fiber, a resin fiber, and a metal fiber. Examples of the resin fiber include polyolefin fibers such as a polyethylene (PE) fiber and a polypropylene (PP) fiber, polyester fibers such as a polyethylene terephthalate (PET) fiber and a polyethylene naphthalate fiber, acrylic fibers such as an acrylonitrile fiber, and polyamide fibers including an aromatic polyamide fiber. The resin fiber may be a composite fiber of two or more resins. An example of the composite fiber is a fiber having a core-sheath structure composed of a core and a sheath covering the core. The melting point of the sheath may be lower than the melting point of the core. A specific example of the composite fiber is a fiber composed of a PET core and a PE sheath. In this case, since PE strongly joins to the porous fluorine resin membrane 2, the air-permeable supporting layer 5 and the porous fluorine resin membrane 2 are more reliably joined together. The air-permeable supporting layer 5 may be a non-woven fabric formed of a resin fiber. An example of the non-woven fabric is a spunbond non-woven fabric.

The air-permeable supporting layer 5 may include a material other than the above-described one. An example of the material is a binder for binding the fibers in the air-permeable supporting layer 5 formed of the fibrous material. Examples of the binder are the same as the examples of the binder the glass filter medium layer 3 can include.

The thickness of the air-permeable supporting layer 5 is, for example, 100 to 550 μm, and may be 150 to 450 μm, or even 200 to 350 μm.

The grammage of the air-permeable supporting layer 5 is, for example, 10 g/m$^2$ or more, and may be 15 g/m$^2$ or more, 20 g/m$^2$ or more, or even 30 g/m$^2$ or more. The upper limit of the grammage is, for example, 100 g/m$^2$ or less, and may be 70 g/m$^2$ or less.

The air-permeable supporting layer 5 is generally a layer having high air permeability in the thickness direction, compared to the porous fluorine resin membrane 2 and the glass filter medium layer 3. The initial pressure drop $PD_0$ of the air-permeable supporting layer 5 at a permeate flow rate of 5.3 cm/sec is, for example, 1 to 60 Pa, and may be 2 to 20 Pa, 2 to 10 Pa, or even 2 to 4 Pa.

The collection efficiency CE measured for the air-permeable supporting layer 5 using polydisperse PAO particles under conditions where the evaluation target particle size is 0.3 to 0.5 μm and the permeate flow rate is 5.3 cm/sec is, for example, 20% or less, and may be 10% or less. The lower limit of the collection efficiency CE is, for example, 1% or more, and may be 5% or more.

The air-permeable supporting layer 5 of FIG. 2 may be a single layer. The air-permeable supporting layer 5 may be a laminate composed of two or more identical or different layers.

The air-permeable supporting layer 5 of FIG. 2 is in contact with the glass filter medium layer 3 and the porous fluorine resin membrane 2. An additional layer may be placed between the air-permeable supporting layer 5 and the glass filter medium layer 3. An additional layer may be placed between the air-permeable supporting layer 5 and the porous fluorine resin membrane 2.

In the air filter medium 1 of FIG. 2, one outermost layer is the glass filter medium layer 3, and the other outermost layer is the porous fluorine resin membrane 2.

Figure 3:
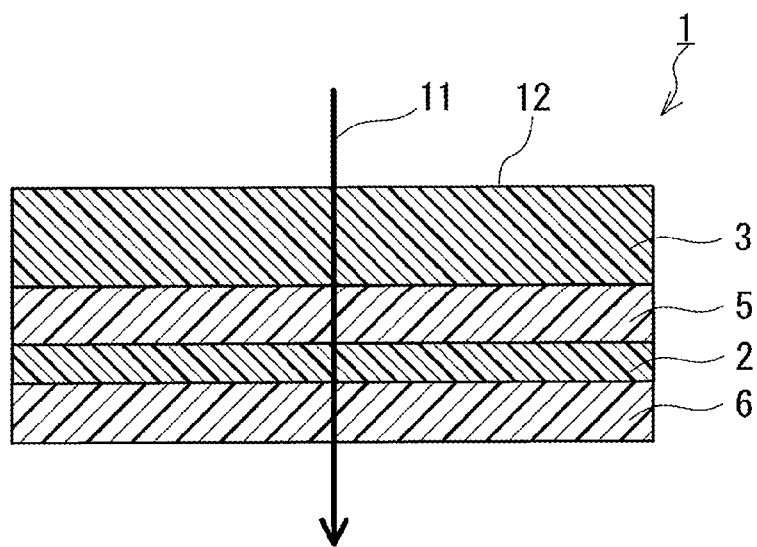
FIG. 3 is a cross-sectional view schematically showing yet another example of the air filter medium of the present invention.

FIG. 3 shows another example of the air filter medium 1 including the additional layer. The air filter medium 1 of FIG. 3 has the same configuration as that of the air filter medium 1 of FIG. 2, except that the air filter medium 1 of FIG. 3 further includes a second air-permeable supporting layer 6. The air-permeable supporting layer 6 is placed on the downstream side in the direction of the air flow 11 with respect to the porous fluorine resin membrane 2. The air-permeable supporting layer 6 and the air-permeable supporting layer 5 sandwich the porous fluorine resin membrane 2. The air filter medium 1 of FIG. 3 includes one glass filter medium layer 3, one air-permeable supporting layer 5, one porous fluorine resin membrane 2, and one air-permeable supporting layer 6.

(Second Air-Permeable Supporting Layer)

The second air-permeable supporting layer 6 can function as a layer supporting the porous fluorine resin membrane 2 from the downstream side in the direction of the air flow 11. The air-permeable supporting layer 6 is generally a layer having high air permeability in the thickness direction, compared to the porous fluorine resin membrane 2 and the glass filter medium layer 3.

The air-permeable supporting layer 6 is, for example, formed of a fibrous material. However, the air-permeable supporting layer 6 is not limited to a layer formed of a fibrous material as long as the air-permeable supporting layer 6 can support the porous fluorine resin membrane 2.

The air-permeable supporting layer 6 can have any combination of the configurations and/or the properties described above for the air-permeable supporting layer 5. The air-permeable supporting layer 6 may be identical to the air-permeable supporting layer 5.

The air-permeable supporting layer 6 of FIG. 3 is in contact with the porous fluorine resin membrane 2. An additional layer may be placed between the air-permeable supporting layer 6 and the porous fluorine resin membrane 2. However, the initial pressure drop $PD_0$ of the air filter medium 1 can be reduced more when the air-permeable supporting layer 6 and the porous fluorine resin membrane 2 are in contact with each other with no additional layer therebetween.

In the air filter medium 1 of FIG. 3, one outermost layer is the glass filter medium layer 3, and the other outermost layer is the air-permeable supporting layer 6.

Figure 4:
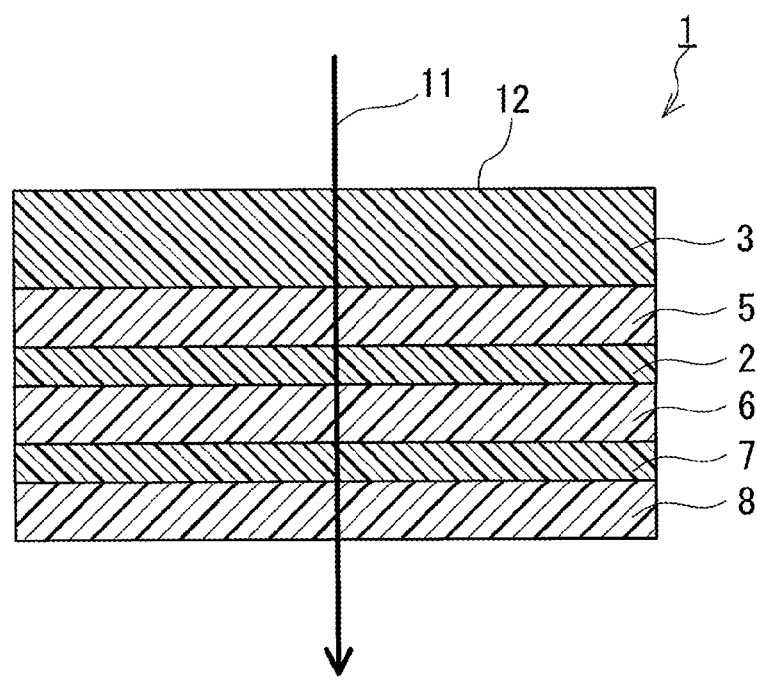
FIG. 4 is a cross-sectional view schematically showing yet another example of the air filter medium of the present invention.

FIG. 4 shows another example of the air filter medium 1 including the additional layer. The air filter medium 1 of FIG. 4 has the same configuration as that of the air filter medium 1 of FIG. 3, except that the air filter medium 1 of FIG. 4 further includes a second porous fluorine resin membrane 7 and a third air-permeable supporting layer 8. The porous fluorine resin membrane 7 is placed on the downstream side in the direction of the air flow 11 with respect to the porous fluorine resin membrane 2 and the air-permeable supporting layer 6. The air-permeable supporting layer 8 is placed on the downstream side in the direction of the air flow 11 with respect to the porous fluorine resin membrane 7. The air-permeable supporting layer 6 and the air-permeable supporting layer 8 sandwich the porous fluorine resin membrane 7. The air filter medium 1 of FIG. 4 includes one glass filter medium layer 3, one air-permeable supporting layer 5, one porous fluorine resin membrane 2, one air-permeable supporting layer 6, one porous fluorine resin membrane 7, and one air-permeable supporting layer 8.

(Second Porous Fluorine Resin Membrane)

The second porous fluorine resin membrane 7, as well as the porous fluorine resin membrane 2, can function as a main filter of the air filter medium 1.

The porous fluorine resin membrane 7 can have any combination of the configurations and/or the properties described above for the porous fluorine resin membrane 2. The porous fluorine resin membrane 7 may be identical to the porous fluorine resin membrane 2. The porous fluorine resin membrane 7 may be a membrane having a lower air permeability (a larger pressure drop PD) and/or a higher collection efficiency CE than those of the porous fluorine resin membrane 2.

The porous fluorine resin membrane 7 of FIG. 4 is in contact with the air-permeable supporting layer 6. An additional layer may be placed between the porous fluorine resin membrane 7 and the air-permeable supporting layer 6. However, the initial pressure drop $PD_0$ of the air filter medium 1 can be reduced more when the porous fluorine resin membrane 7 and the air-permeable supporting layer 6 are in contact with each other with no additional layer therebetween.

(Third Air-Permeable Supporting Layer)

The third air-permeable supporting layer 8 can function as a layer supporting the porous fluorine resin membrane 7 from the downstream side in the direction of the air flow 11. The air-permeable supporting layer 8 can have any combination of the configurations and/or the properties described above for the air-permeable supporting layer 5. The air-permeable supporting layer 8 may be identical to the air-permeable supporting layer 5 and/or the air-permeable supporting layer 6.

The air-permeable supporting layer 8 of FIG. 4 is in contact with the porous fluorine resin membrane 7. An additional layer may be placed between the air-permeable supporting layer 8 and the porous fluorine resin membrane 7. However, the initial pressure drop $PD_0$ of the air filter medium 1 can be reduced more when the air-permeable supporting layer 8 and the porous fluorine resin membrane 7 are in contact with each other with no additional layer therebetween.

In the air filter medium 1 of FIG. 4, one outermost layer is the glass filter medium layer 3, and the other outermost layer is the air-permeable supporting layer 8.

The layers in the air filter medium 1 are joined to each other. The glass filter medium layer 3, the porous fluorine resin membrane(s), and the air-permeable supporting layer (s) can be joined, for example, by thermal lamination or lamination using an adhesive. Joining by thermal lamination is preferred because, in that case, a pressure drop increase at an joining interface can be reduced. The air filter medium 1 can be produced, for example, by joining the layers included in the filter medium 1.

Figure 5:
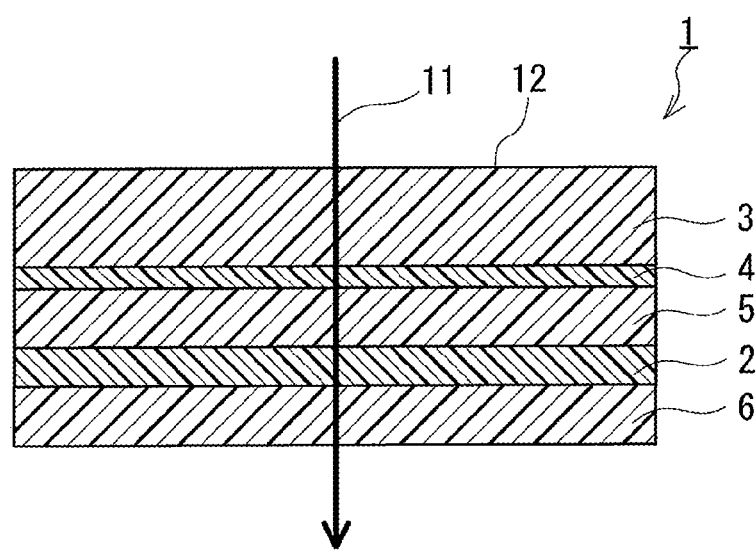
FIG. 5 is a cross-sectional view schematically showing yet another example of the air filter medium of the present invention.

As shown in FIG. 5, the porous fluorine resin membrane 2 or a laminate including the porous fluorine resin membrane 2 and the glass filter medium layer 3 may be joined by the air-permeable adhesive layer 4. In this case, the air filter medium 1 can be produced by joining the porous fluorine resin membrane 2 or a laminate including the porous fluorine resin membrane 2 and the glass filter medium layer 3 by the air-permeable adhesive layer 4. However, the method for producing the air filter medium 1 is not limited to the above examples.

(Embodiment Including Air-Permeable Adhesive Layer)

The air filter medium 1 of FIG. 5 has the same configuration as that of the air filter medium 1 of FIG. 3, except that the air filter medium 1 of FIG. 5 further includes the air-permeable adhesive layer 4 between the glass filter medium layer 3 and the porous fluorine resin membrane 2, specifically, between the glass filter medium layer 3 and the air-permeable supporting layer 5. In the air filter medium 1 of FIG. 5, the glass filter medium layer 3, the air-permeable adhesive layer 4, the air-permeable supporting layer 5, the porous fluorine resin membrane 2, and the air-permeable supporting layer 6 are placed in this order from upstream to downstream of the air filter medium 1 configured to allow the air flow 11 to pass through the air filter medium 1. In other words, the glass filter medium layer 3 and the air-permeable adhesive layer 4 are placed in this order from upstream on the upstream side in the direction of the air flow 11 with respect to the porous fluorine resin membrane 2.

The air-permeable adhesive layer 4 is a layer formed of an adhesive. The air-permeable adhesive layer 4 can function as a layer joining the glass filter medium layer 3 and a laminate including the porous fluorine resin membrane 2. The air-permeable adhesive layer 4 can function as a layer that hinders movement of liquid particles once collected by the glass filter medium layer 3 to the porous fluorine resin membrane 2.

The grammage of the air-permeable adhesive layer 4 is, for example, 2 to 30 g/m$^2$. The lower limit of the grammage may be 4 g/m$^2$ or more, 5.5 g/m$^2$ or more, 6 g/m$^2$ or more, 7 g/m$^2$ or more, or even 8 g/m$^2$ or more. The upper limit of the grammage may be 25 g/m$^2$ or less, 24 g/m$^2$ or less, 20 g/m$^2$ or less, 18 g/m$^2$ or less, or even 16 g/m$^2$ or less.

Examples of the adhesive forming the air-permeable adhesive layer 4 include various adhesives such as rubber, acrylic, silicone, and urethane adhesives. The adhesive may be a hot-melt adhesive. More specific examples of the adhesive include a styrene-butadiene-styrene elastomer (SBS), a styrene-isoprene-styrene elastomer (SIS), an ethylene vinyl acetate (EVA), a polyolefin, and a polyamide. The adhesive is not limited to the above examples.

The air-permeable adhesive layer 4 may be a layer formed of a fibrous adhesive. Fibers of the fibrous adhesive may be randomly dispersed in an in-plane direction and a thickness direction of the layer. An average fiber diameter of the fibers of the fibrous adhesive is, for example, 10 to 30 μm, and may be 15 to 28 μm, or even 20 to 25 μm. The air-permeable adhesive layer 4 formed of the fibrous adhesive can be formed, for example, by spraying the adhesive on a layer to be in contact with the air-permeable adhesive layer 4 in the air filter medium 1. The air-permeable adhesive layer 4 formed of the fibrous adhesive may be formed by transferring the air-permeable adhesive layer 4 formed on a transfer film by spraying or the like to a layer to be in contact with the air-permeable adhesive layer 4 in the air filter medium 1.

The thickness of the air-permeable adhesive layer 4 is, for example, 5.5 to 16 μm, and may be 6 to 14 μm, or even 7 to 12 μm.

The air-permeable adhesive layer 4 of FIG. 5 may be a single layer. The air-permeable adhesive layer 4 may be a laminate composed of two or more identical or different layers.

The air-permeable adhesive layer 4 of FIG. 5 is in contact with the glass filter medium layer 3 and the air-permeable supporting layer 5. An additional layer may be placed between the air-permeable adhesive layer 4 and the glass filter medium layer 3. An additional layer may be placed between the air-permeable adhesive layer 4 and the air-permeable supporting layer 5.

The thickness of the air filter medium 1 is, for example, 200 to 1000 μm, and may be 300 to 900 μm, or even 400 to 800 μm.

The grammage of the air filter medium 1 is, for example, 60 to 200 g/m$^2$, and may be 80 to 180 g/m$^2$, or even 100 to 160 g/m$^2$.

The initial pressure drop PD$_0$ of the air filter medium 1 at a permeate flow rate of 5.3 cm/sec is, for example, 50 to 300 Pa, and may be 70 to 250 Pa, or even 100 to 200 Pa. Incidentally, the initial pressure drop PD$_0$ of the air filter medium 1 is generally lower than a glass fiber filter medium having the same collection efficiency CE.

The collection efficiency CE measured for the air filter medium 1 using polydisperse PAO particles under conditions where the evaluation target particle size is 0.1 to 0.2 μm and the permeate flow rate is 5.3 cm/sec is, for example, 85% or more, and may be 90% or more, 95% or more, 97% or more, 98% or more, 99% or more, or even 99.5% or more. The upper limit of the collection efficiency CE is, for example, 99.99% or less, and may be 99.9% or less.

The PF value determined for the air filter medium 1 by the above equation (2) is, for example, 20 or more, and may be 22 or more, 23 or more, 25 or more, 27 or more, 28 or more, or even 30 or more. The upper limit of the PF value is, for example, 40 or less, and may be 38 or less, 36 or less, or even 35 or less.

When polydisperse PAO particles are allowed to pass through the air filter medium 1 at a concentration of 0.2 to 0.5 g/m$^3$ and a linear velocity of 5.3 cm/sec and a variation of the pressure drop of the air filter medium 1 is measured, an amount (hereinafter referred to as "PAO holding amount") of the PAO particles having been collected by the air filter medium 1 is, for example, 50 g/m$^2$ or more at a moment when the pressure drop reaches 500 Pa, and may be 60 g/m$^2$ or more, 70 g/m$^2$ or more, 80 g/m$^2$ or more, 90 g/m$^2$ or more, or even 100 g/m$^2$ or more at the above moment. The upper limit of the PAO holding amount at the above moment is, for example, 200 g/m$^2$ or less. The greater the PAO holding amount is, the more the above pressure drop increase is reduced and, for example, the longer service life the air filter medium 1 used in an environment including liquid particles can have. It should be noted that 500 Pa corresponds to a pressure drop at which replacement of an air filter medium is considered in general.

The PAO holding amount of the air filter medium 1 can be evaluated in the following manner. The air filter medium 1 serving as an evaluation object is set in a holder described above and used for evaluation of the pressure drop PD and the collection efficiency CE. The filter medium 1 is measured for its weight (initial weight W$_0$) before set. Next, air is allowed to pass through the set filter medium 1, and the linear velocity of the air passing through the filter medium 1 is adjusted to 5.3 cm/sec with the aid of a flow meter. It should be noted that a direction in which the air flows is a direction from the glass filter medium layer 3 of the filter medium 1 to the porous fluorine resin membrane 2 thereof. Then, polydisperse PAO particles are introduced in the air passing through the filter medium 1 at a concentration of 0.2 to 0.5 g/m$^3$ so as to be collected by the filter medium 1. Measurement of the pressure drop of the filter medium 1 using a pressure meter (manometer) is then started. The linear velocity of the air passing through the filter medium 1 is maintained at 5.3 cm/sec. At a moment when the pressure drop under measurement reaches 500 Pa, the flow of the air passing through the filter medium 1 is stopped. Subsequently, the filter medium 1 is detached from the holder, and a weight (reached weight) W$_1$ (g) of the filter medium 1 is measured. The PAO holding amount of the air filter medium 1 can be determined by substituting the initial weight W$_0$ (g) and the measured reached weight W$_1$ (g) of the filter medium 1 into the following equation (4).

$$\text{PAO holding amount (g/m}^2\text{)} = [\text{reached weight } W_1 \text{ (g)} - \text{initial weight } W_0 \text{ (g)}]/(100 \text{ cm}^2 \times 10^{-4}) \quad (4)$$

A reduction in mass of the air filter medium 1 may be 70 mg or less, the reduction being evaluated for an evaluation surface after 10 rubs according to Method C (Taber method) of an abrasion resistance test defined in Japanese Industrial Standards (JIS) L 1096, the evaluation surface being the surface 12 of the glass filter medium layer 3 on the upstream side in the direction of the air flow 11. The reduction in mass may be 60.0 mg or less, 50.0 mg or less, 40.0 mg or less, 30.0 mg or less, 25.0 mg or less, 20.0 mg or less, or even 15.0 mg or less. The lower limit of the reduction in mass is, for example, 2.0 mg or more, and may be 5.0 mg or more, 7.0 mg or more, or even 10.0 mg or more. The smaller the reduction in mass is, the higher abrasion resistance the surface 12 has. The higher abrasion resistance the surface 12 has, the more the durability of the air filter medium 1 to below-described pleating can be improved. It should be noted that No. CS-10 (load: 2.45 N) is used as an abrasive wheel used in Method C of the abrasion resistance test. A region which is a portion of the evaluation surface and with which the abrasive wheel is in contact has the shape of a ring having an area of 30 cm$^2$. The rotation rate of the abrasive wheel is 60 rotations/min.

Since the air filter medium 1 reduces an increase in the pressure drop PD even in an environment including liquid particles, the air filter medium 1 is suitable for applications such as use as filters for outside air filtration, such as air-intake filters for turbines and filters for introducing outside air. However, the application of the air filter medium 1 is not limited to the above examples. The air filter medium 1 can be used in the same application as conventional air filter mediums.

The air filter medium 1 can be distributed, for example, in a sheet shape or a strip shape. The strip-shaped air filter medium 1 can be distributed in the form of a wound body wound around a winding core.

The air filter medium 1 can be used as a pleated filter pleat pack.

[Filter Pleat Pack]

Figure 6:
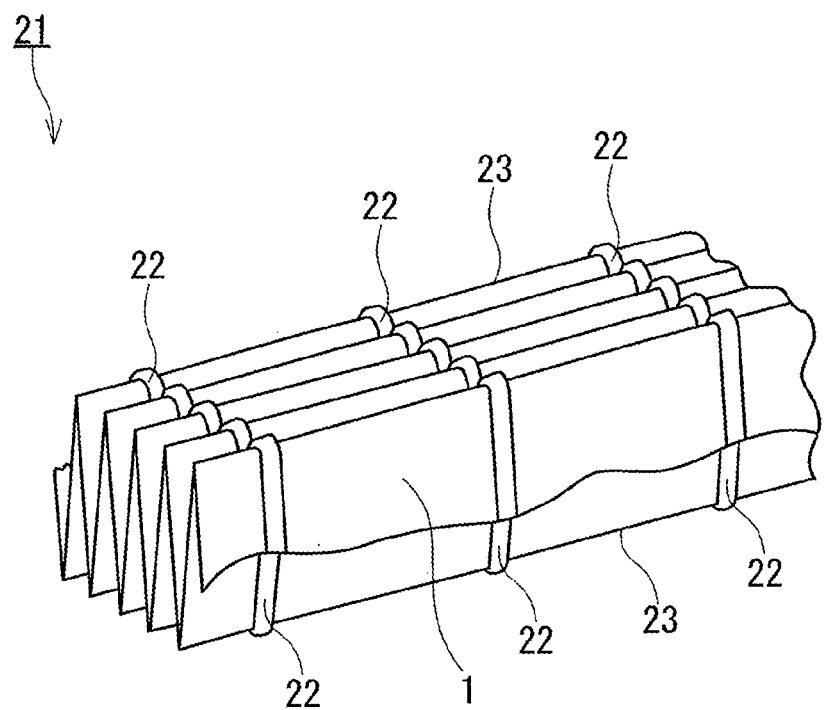
FIG. 6 is a perspective view schematically showing an example of the filter pleat pack of the present invention.

FIG. 6 shows an example of the filter pleat pack of the present embodiment. A filter pleat pack 21 shown in FIG. 6 includes the air filter medium 1 folded into pleats. The filter pleat pack 21 is formed by pleating the air filter medium 1. The air filter medium 1 is folded so as to have a continuous W-shape from a lateral view. By making the air filter medium 1 into the pleat pack 21 and incorporating the pleat pack 21 into an air filter unit, the filtration area of the air filter unit with respect to the ventilation area (the area of an opening of a frame) can be increased. Since including the air filter medium 1, the filter pleat pack 21 is suitable for use in an environment including liquid particles such as oil mist.

The filter pleat pack of the present invention may include an additional member in addition to the air filter medium 1. The filter pleat pack 21 shown in FIG. 6 further includes a string-shaped resin referred to as a bead 22. The bead 22 is a kind of spacer for maintaining the shape of the pleated air filter medium 1. The bead 22 of FIG. 6 is placed on a surface of the folded air filter medium 1 to extend along a direction intersecting with pleat line(s) 23 (a mountain fold and/or a valley fold) of the air filter medium 1. However, the shape and the arrangement of the bead 22 are not limited to the above example. The bead 22 of FIG. 6 is placed on each of two surfaces of the air filter medium 1, but the bead 22 may be placed on one of the surfaces of the air filter medium 1. It is preferred that the bead 22 be placed not on the porous fluorine resin membrane 2 but on the glass filter medium layer 3 and/or the air-permeable supporting layer 6 or 8. When a placement surface where the bead 22 is placed is viewed in plan, the filter pleat pack 21 may include a plurality of beads 22 placed in parallel to each other at a given interval in a direction in which the pleat line 23 extends. In the example of FIG. 6, at least three beads 22 are placed on each placement surface. The bead 22 can be formed by applying a molten resin in a string shape. Examples of the resin include polyamides and polyolefins.

Pleating of the air filter medium 1 can be performed using a known technique, such as a reciprocating processing machine or a rotary processing machine.

[Air Filter Unit]

Figure 7:
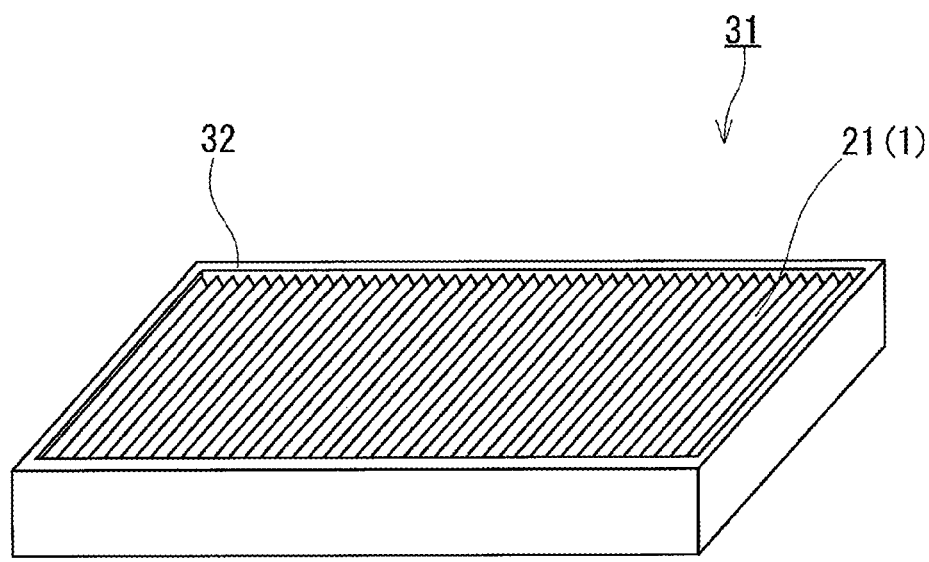
FIG. 7 is a perspective view schematically showing an example of the air filter unit of the present invention.

FIG. 7 shows an example of the air filter unit of the present embodiment. An air filter unit 31 shown in FIG. 7 includes the filter pleat pack 21 and a frame 32 supporting the filter pleat pack 21. In the air filter unit 31, a peripheral portion of the filter pleat pack 21 is supported by the frame (support frame) 32. The frame 32 is formed of, for example, a metal, a resin, or a composite material thereof. In the case where the frame 32 is formed of a resin, the filter pleat pack 21 can be fixed to the frame 32 at the time of formation of the frame 32. The configuration of the frame 32 may be the same as the configuration of a frame included in a conventional air filter unit. Since including the air filter medium 1, the air filter unit 31 is suitable for reducing a pressure drop increase even in an environment including liquid particles such as oil mist.

The air filter unit 31 of FIG. 7 includes the air filter medium 1 as the filter pleat pack 21. The configuration of the air filter unit of the present invention is not limited to the above example as long as the air filter unit includes the air filter medium 1.

The air filter unit 31 may be a unit including a high-efficiency particulate air grade (HEPA) filter or an ultra-low penetration air grade (ULPA) filter as specified in JIS Z 8122:2000.

EXAMPLES

The present invention will be described more specifically by way of examples. The present invention is not limited to embodiments shown in the following examples.

Methods for evaluating air filter mediums produced in the examples and layers included in the filter mediums will be described.

[C/Si]

The ratio C/Si of a surface of each glass filter medium layer was evaluated using a scanning X-ray fluorescence analyzer ZSX Primus IV, which is a wavelength-dispersive evaluation apparatus, manufactured by Rigaku Corporation. The ratio C/Si was evaluated as a ratio of a peak intensity of C to a peak intensity of Si shown in an X-ray fluorescence profile of the above surface obtained by the evaluation. The configuration of the apparatus and the evaluation conditions were as follows.

X-ray source: X-ray tube having a rhodium target

X-ray output: 3 kW (accelerating voltage: 30 kV; applied current: 100 mA)

Dispersive crystal: for C, synthetic multilayer built-up film RX61 manufactured by Rigaku Corporation; for Si, pentaerythritol crystal PETH Specimen size: the shape of a disc having a diameter of 50 mm Measurement region: set to a 30 mm diameter circle having its center at a center of the specimen

[Initial Pressure Drop $PD_0$]

The initial pressure drop $PD_0$ of each air filter medium was evaluated by the above method.

[PAO Holding Amount]

The PAO holding amount of each air filter medium was evaluated by the above method. The polydisperse PAO particles used in the evaluation were PAO (Durasyn 164) manufactured by INEOS, and were generated using a constant-output aerosol atomizer (TSI No. 3076 manufactured by TOKYO DYLEC CORP.). It should be noted that the polydisperse PAO particles introduced in the air passing through the evaluation objects were single peak particles having a peak in number only in the particle size range of 0.1 to 0.2 µm.

[Abrasion Resistance of Surface]

The reduction in mass was evaluated by the above method for one exposed surface (which is formed of a surface of the glass filter medium layer) of each produced air filter medium after 10 rubs. Specifically, a Taber abrasion tester (rotary abrasion tester No. 5130 manufactured by Toyo Seiki Seisaku-sho, Ltd.) was used for the evaluation. No. CS-10 was used as an abrasive wheel. The test was performed by applying a 2.45 N load to the abrasive wheel. The rotation rate of the abrasive wheel was 60 rotations/min.

[Production of Porous PTFE Membrane A]

An amount of 100 parts by weight of a fine PTFE powder (POLYFLON PTFE F-104 manufactured by DAIKIN INDUSTRIES, LTD.) and 20 parts by weight of dodecane serving as a liquid lubricant were uniformly mixed to obtain a mixture. Next, the mixture was extruded into a sheet shape using an extruder to obtain a strip-shaped PTFE sheet (thickness: 1.5 mm; width: 20 cm). Then, the obtained PTFE sheet was rolled using a pair of metal pressure rolls. During the rolling, the PTFE sheet was pulled in the longitudinal direction by another roll placed downstream of the pressure rolls so that the width of the PTFE sheet would be the same before and after the rolling. The rolled PTFE sheet had a thickness of 200 µm.

Next, the PTFE sheet was held in an atmosphere at 150° C. to remove the liquid lubricant. After that, the PTFE sheet was stretched by roll stretching in the longitudinal direction at a stretching temperature of 300° C. and a stretching ratio of 25 and was then stretched by tenter stretching in the width direction at a stretching temperature of 100° C. and a stretching ratio of 30 to obtain an unsintered porous PTFE membrane. Then, the obtained porous membrane was sintered at 400° C. in a hot-air furnace to obtain a strip-shaped porous PTFE membrane A.

[Preparation of Glass Filter Medium Layer B1]

A glass fiber filter medium having a thickness of 380 µm, a grammage of 63 g/m$^2$, and a ratio C/Si of 0.028 at a surface was prepared as a glass filter medium layer B1. The glass filter medium layer B1 included an acrylic resin as a binder for binding the glass fibers forming the glass filter medium layer B1.

[Preparation of Glass Filter Medium Layer B2]

A glass fiber filter medium having a thickness of 400 µm, a grammage of 68 g/m$^2$, and a ratio C/Si of 0.029 at a surface was prepared as a glass filter medium layer B2. The glass filter medium layer B2 included an acrylic resin as a binder for binding the glass fibers forming the glass filter medium layer B2.

[Preparation of Glass Filter Medium Layer B3]

A glass fiber filter medium having a thickness of 280 µm, a grammage of 65 g/m$^2$, and a ratio C/Si of 0.036 at a surface was prepared as a glass filter medium layer B3. The glass filter medium layer B3 included a polyvinyl acetate resin, which is one of polyvinyl alcohol resins, as a binder for binding the glass fibers forming the glass filter medium layer B3.

[Preparation of Glass Filter Medium Layer B4]

A glass fiber filter medium having a thickness of 280 µm, a grammage of 65 g/m$^2$, and a ratio C/Si of 0.021 at a surface was prepared as a glass filter medium layer B4. The glass filter medium layer B4 included a polyvinyl acetate resin, which is one of polyvinyl alcohol resins, as a binder for binding the glass fibers forming the glass filter medium layer B4.

[Preparation of Glass Filter Medium Layer B5]

A glass fiber filter medium having a thickness of 400 µm, a grammage of 68 g/m$^2$, and a ratio C/Si of 0.019 at a surface was prepared as a glass filter medium layer B5. The glass filter medium layer B5 included an acrylic resin as a binder for binding the glass fibers forming the glass filter medium layer B5.

[Preparation of Air-Permeable Supporting Layer C]

A spunbond non-woven fabric (ELEVES S0303WDO manufactured by UNITIKA LTD.) formed of a PET-PE composite fiber was prepared as an air-permeable supporting layer C. This PET-PE composite fiber has a core-sheath structure composed of a PET core and a PE sheath. The air-permeable supporting layer C has a thickness of 220 µm and a grammage of 30 g/m$^2$.

Example 1

The porous PTFE membrane A and a pair of the air-permeable supporting layers C were stacked in such a manner that the air-permeable supporting layers C sandwiched the porous PTFE membrane A. The resulting body as a whole was subjected to thermal lamination at 160° C. to obtain a laminate having a three-layer structure composed of "air-permeable supporting layer C/porous PTFE membrane A/air-permeable supporting layer C". Next, the obtained laminate and the glass filter medium layer B1 were joined to each other by an air-permeable adhesive layer to obtain an air filter medium of Example 1. The joining was performed by press lamination of the glass filter medium layer B1 to a surface obtained by spraying a hot-melt synthetic rubber adhesive (MORESCO-MELT TN-286Z manufactured by MORESCO Corporation) on one of the exposed surfaces formed of the air-permeable supporting layers C of the laminate so that the grammage would be 8 g/m$^2$. A pair of rolls were used in the thermal lamination and the press lamination (the same applies to Examples and Comparative Example below).

Example 2

An air filter medium of Example 2 was obtained in the same manner as in Example 1, except that the glass filter medium layer B2 was used instead of the glass filter medium layer B1.

Example 3

An air filter medium of Example 3 was obtained in the same manner as in Example 1, except that the glass filter medium layer B3 was used instead of the glass filter medium layer B1.

Example 4

An air filter medium of Example 4 was obtained in the same manner as in Example 1, except that the glass filter medium layer B4 was used instead of the glass filter medium layer B1.

Comparative Example 1

An air filter medium of Comparative Example 1 was obtained in the same manner as in Example 1, except that the glass filter medium layer B5 was used instead of the glass filter medium layer B1.

Table 1 shows evaluation results of the air filter mediums of Examples and Comparative Example. The sign "–" in Table 1 indicates "not measured".

TABLE 1

| | Air filter medium | | | |
|---|---|---|---|---|
| | Glass filter medium layer C/Si | Initial pressure drop (Pa) | PAO holding amount (g/m$^2$) | Abrasion resistance test Reduction in mass (mg) |
| Example 1 | 0.028 | 111 | 106 | 10.7 |
| Example 2 | 0.029 | 185 | 73 | 22.3 |
| Example 3 | 0.036 | 121 | 93 | 40.0 |
| Example 4 | 0.021 | 129 | 70 | 60.0 |
| Comparative Example 1 | 0.019 | 185 | 40 | 26.7 |

As shown in Table 1, the PAO holding amounts of Examples were greater than that of Comparative Example.

INDUSTRIAL APPLICABILITY

The air filter medium of the present invention can be used in the same applications as conventional air filter mediums. Examples of the applications include air filter mediums, filter pleat packs, and air filter units used as air-intake filters for outside air treatment and air-intake filters of turbines.

The invention claimed is:

1. An air filter medium comprising a porous fluorine resin membrane, the air filter medium further comprising:
   a glass filter medium layer, wherein
   the glass filter medium layer and the porous fluorine resin membrane are placed in this order from upstream to downstream of the air filter medium configured to allow an air flow to pass through the air filter medium, and
   at a surface of the glass filter medium layer on an upstream side in a direction of the air flow, a carbon-to-silicon ratio (C/Si) evaluated by X-ray fluorescent analysis is 0.020 or more.

2. The air filter medium according to claim 1, wherein the carbon-to-silicon ratio at the surface on the upstream side is 0.025 or more.

3. The air filter medium according to claim 1, wherein the carbon-to-silicon ratio at the surface on the upstream side is 0.030 or less.

4. The air filter medium according to claim 1, wherein a reduction in mass of the air filter medium is 70 mg or less, the reduction being evaluated for an evaluation surface after 10 rubs according to Method C (Taber method) of an abrasion resistance test defined in JIS L 1096, the evaluation surface being the surface on the upstream side.

5. The air filter medium according to claim 1, wherein the surface on the upstream side forms one of exposed surfaces of the air filter medium.

6. The air filter medium according to claim 1, further comprising a first air-permeable supporting layer placed between the glass filter medium layer and the porous fluorine resin membrane.

7. The air filter medium according to claim 1, further comprising a second air-permeable supporting layer placed on a downstream side in the direction of the air flow with respect to the porous fluorine resin membrane.

8. The air filter medium according to claim 1, wherein the porous fluorine resin membrane is a porous polytetrafluoroethylene membrane.

9. The air filter medium according to claim 1, wherein there is only one of the porous fluorine resin membrane in the air filter medium.

10. A filter pleat pack comprising an air filter medium folded into pleats, wherein
    the air filter medium is the air filter medium according to claim 1.

11. An air filter unit comprising an air filter medium, wherein
    the air filter medium is the air filter medium according to claim 1.

12. An air filter unit comprising a filter pleat pack, wherein
    the filter pleat pack is the filter pleat pack according to claim 10.

* * * * *